United States Patent [19]
Domicone et al.

[11] 3,902,545
[45] Sept. 2, 1975

[54] BETA-SPODUMENE REGENERATORS COATED WITH A FLUORINATED COPOLYMER OF ETHYLENE AND PROPYLENE

[75] Inventors: Joseph J. Domicone, Horseheads; Charles J. Parker, Painted Post, both of N.Y.

[73] Assignee: Corning Glass Works, Corning, N.Y.

[22] Filed: Aug. 3, 1973

[21] Appl. No.: 385,565

[52] U.S. Cl. .................. 165/10; 165/5; 428/411; 428/441; 428/523; 427/238; 427/375
[51] Int. Cl. ....................... F28d 7/02; B32b 27/06
[58] Field of Search ..... 117/123 C, 123 D, 161 UA, 117/161 UZ; 260/33.8 F; 165/5, 10

[56] References Cited
UNITED STATES PATENTS

| | | | |
|---|---|---|---|
| 2,662,065 | 12/1953 | Berry | 117/123 |
| 3,062,793 | 11/1962 | Sousa | 117/161 |
| 3,112,184 | 11/1963 | Hollenbach | 264/286 |
| 3,318,854 | 5/1967 | Honn et al. | 117/161 |

Primary Examiner—William D. Martin
Assistant Examiner—Sadie L. Childs
Attorney, Agent, or Firm—Clinton J. Janes, Jr.; Clarence R. Patty, Jr.

[57] ABSTRACT

Beta-spodumene ceramic articles such as gas turbine regenerators are rendered more resistant to attack by moist sulfur oxide-containing gases such as the exhaust gases from certain hydrocarbon combustion processes by providing a protective layer of fluorinated ethylene-propylene copolymer thereon.

1 Claim, No Drawings

BETA-SPODUMENE REGENERATORS COATED WITH A FLUORINATED COPOLYMER OF ETHYLENE AND PROPYLENE

BACKGROUND OF THE INVENTION

U.S. Pat. No. 3,112,184 to Hollenbach describes the manufacture of thin-walled ceramic articles of honeycomb structure, useful as regenerators, radiators, catalyst carriers, filters and the like. These structures are fabricated from essentially any sinterable ceramic material by a process comprising applying a suspension of pulverized ceramic material and a binder to a flexible sheet carrier, corrugating the coated carrier and forming it into an article of the desired shape, and finally firing the article to sinter the pulverized ceramic material into a unitary structure.

Ceramic honeycomb structures composed principally of beta-spodumene have been used commercially as regenerators (heat exchangers) for gas turbine engines. Beta-spodumene is a crystalline lithium aluminosilicate demonstrating good high temperature stability and a low coefficient of thermal expansion. Ceramic honeycomb structures fabricated from beta-spodumene and beta-spodumene solid solutions, whether by the method of Hollenbach or any other suitable means, provide regenerators and other heat resistant articles offering a very desirable combination of properties.

In a typical gas turbine regenerator application, the regenerator is in the form of a large thick disc or wheel positioned across the intake and exhaust ports of the gas turbine engine with channels across its thickness through which the intake and exhaust gases flow. In operation, the wheel is continuously rotated so that regions heated by the exiting exhaust gases are thereafter interposed across the intake port to heat incoming air for the combustion process. In this way, both the heating of the intake air and the cooling of the exhaust gases are simultaneously accomplished.

The increasing use of beta-spodumene-containing regenerators in applications of this type has revealed that the beta-spodumene crystal structure is not entirely stable under thermal cycling conditions in the presence of sulfurcontaining exhaust gases from hydrocarbon combustion processes. More specifically, it has been found that, at temperatures in excess of about 400°F (200°C.), exhaust gases containing water vapor in combination with the oxides of sulfur can interact with beta-spodumene-containing ceramic materials to cause permanent dimensional changes and modifications in thermal expansion behavior which destroy the useful properties of these materials for high temperature and temperature cycling applications.

In the case of gas turbine regenerator wheels, interaction between the exhaust gases and the beta-spodumene phase results in a type of failure known as mid-radius cracking, wherein radial cracks appear in the circular face of the regenerator in the region between the center and the rim. It has been determined that this harmful interaction occurs principally near the cold face of the regenerator, i.e., that face away from the exiting exhaust gases which is first contacted by intake air. This face of the regenerator remains at a lower average temperature than the surface nearest the exhaust. Mid-radius cracking is thought to result from permanent changes in the thermal expansion behavior and density of the beta-spodumene ceramic material in the cold face region. Types of failure other than mid-radius cracking may of course be induced in other types of beta-spodumene bodies by the sulfur oxide-water-spodumene interaction depending upon the nature of the body and the particular application for which it is employed.

It is the principal object of the present invention to provide a means of protecting beta-spodumene ceramic articles from the adverse effects of contact with sulfur-containing exhaust gases from hydrocarbon combustion processes.

It is a further object to provide beta-spodumene articles to be used in high temperature and temperature cycling application as heat exchangers and the like which are resistant to attack by sulfur-containing exhaust gases.

SUMMARY OF THE INVENTION

We have discovered that these and other objects may be attained through the use of a fluorinated ethylene-propylene copolymer film applied to at least a portion of the beta-spodumene ceramic article to protect it from attack by moist sulfur oxide-containing atmospheres. The film is provided by applying to selected regions of the article a coating containing a fluorinated ethylene-propylene copolymer, and thereafter heating the article thus coated to the melting range of the fluorinated copolymer and maintaining it in that range for a time sufficient to permit the copolymer to coalesce into a continuous protective film. Fluorinated ethylene-propylene copolymer demonstrates unusual melt-flow behavior in a melting range such that sufficient dwell times in the melting range permit flow and the formation of a coalesced film.

Among the ceramic articles which may be usefully treated according to the invention are articles wherein beta-spodumene or a beta-spodumene solid solution constitutes the principal crystalline phase (at least about 90% by volume of the article). Other phases, which may be present in minor amounts depending upon the exact composition of the article and the manner in which it is made, include cristobalite, quartz, mullite, titania, zirconia and the like.

The presence of a fluorinated ethylene-propylene copolymer film in accordance with the invention has been found to markedly improve the resistance of beta-spodumene ceramic regenerator materials to the corrosive effects of exhaust gases containing both sulfur oxides and water vapor in the temperature range of maximum corrosion in the turbine engine.

DETAILED DESCRIPTION

Chemical analysis of samples taken from beta-spodumene regenerators which have seen service in turbine engines indicates that the source of the instability of beta-spodumene in the exhaust environment is the loss of lithium from the crystal phase. Thus, whereas the original spodumene material contains about 4–5% $Li_2O$ by weight, investigation reveals that up to about 40% of this lithia may be extracted from certain cold face regions of a regenerator after as little as 2,000 hours of service. This removal of lithium from the beta-spodumene structure produces a drastic change in the thermal expansion behavior and density of the ceramic material in the cold face regions of the regenerator. In contrast, the hot face regions of such a regenerator, which operate at temperatures above the range where substantial corrosion occurs, exhibit negligible lithium extraction and normal thermal behavior and density. It is this difference in properties between cold and hot face regions of the regenerator which is thought to produce cracking failure.

The extraction of lithium from beta-spodumene regenerator wheels which occurs in service in a turbine engine may be reproduced in the laboratory by passing a hot gas stream containing $SO_2$ or $SO_3$ and water vapor over a sample structure. The most active agent attacking the beta-spodumene structure is probably condensed $H_2SO_3$ or $H_2SO_4$, which is believed to extract $Li^+$ ions from the crystal structure of the material according to a reaction such as:

$$Li_2O.Al_2O_3.XSiO_2 + H_2SO_4 \rightarrow H_2O.Al_2O_3.XSiO_2 + Li_2SO_4$$

Thus the extent of attack can be determined from the amount of lithium sulfate on the surface of a sample after treatment or from the amount of residual $Li_2O$ remaining in the beta-spodumene structure.

We have found that protective films consisting essentially of a fluorinated copolymer of ethylene and propylene provides substantial protection from the effects of moist sulfur-oxide-containing exhaust gases when applied to cold face regions of beta-spodumene regenerator wheels. Fluorinated ethylene-propylene copolymers, also commonly known as FEP resins, are solid thermoplastic polymeric materials demonstrating the somewhat unusual property of fluid flow above a melting temperature range. Heating of sufficient duration at temperatures above the melting range produces a continuous FEP film. The substantial protection afforded by fluorinated ethylene-propylene films in service on gas turbine regenerators is surprising in view of the fact that the operating temperatures encountered are well above the accepted use temperatures (about 400°F.) of these films.

FEP-containing compositions suitable for providing films according to the invention are commercially available. Suitable compositions include the "Teflon" FEP enameling compositions manufactured by E. I. du-Pont de Nemours and Co. (Inc.) of Wilmington, Del. These compositions are aqueous dispersions of fluorinated ethylene-propylene resin in a basic medium (pH 8–10) with a solids content ranging about 40–50%. The resin phase has a melting range of 530°–565°F. These compositions may be applied by spraying or other conventional coating technique and the resulting coating may be dried and suitably "cured" to a protective film by heating at temperatures in the range of about 625°–650°F. for times in the range of about 20–60 minutes. Curing temperatures may range as high as 750°F. for short intervals.

While FEP compositions such as above set forth are described by the manufacturer as being heat-stable in use to 400°F., with intermittent exposure to 450°F. being satisfactory in some cases, we have found that FEP films can provide substantial protection from sulfur oxide attack at considerably higher temperatures. The temperature range of maximum effect for sulfur corrosion in the regenerator is about 400°–650°F., such temperatures being typical of the cold face and near-cold face environment. Nevertheless, deterioration of the spodumene structure as measured by the extraction of lithium therefrom is significantly reduced in FEP-protected cold face regions even at these elevated temperatures.

The thickness of the protective fluorinated ethylene-propylene films used to protect beta-spodumene structures under the described conditions is not critical provided sufficient polymer is present to form a continuous layer. In practice, films ranging in thickness from about 0.2–1.0 mils will be employed, with films of 0.5–0.8 mil thickness being preferred. Thicker films may be used but add substantially to the cost of protection.

The following examples illustrate the effectiveness of protective films produced according to the invention.

EXAMPLE I

Samples consisting of sections cut from a beta-spodumene honeycomb regenerator wheel, typically about 1 inch × 1 inch × ⅝ inch in size, are selected for treatment. These samples are composed of thermally-crystallized Corning Code 9455 glass, a material consisting principally of beta-spodumene but also containing minor amounts of mullite. A number of these samples are provided with a protective fluorinated ethylene-propylene film by a process comprising spraying one face of the honeycomb with a 40% dispersion of FEP in water, subjecting the sample to 40 psi air pressure to force the dispersion into the pore structure of the material, and heating at 625°–650°F. for one hour to cause the dispersed FEP to coalesce into a continuous film. The protective films thus produced average about ½ mil in thickness.

Two honeycomb samples, one protected with an FEP film and the other unprotected, are selected for further treatment. Each sample is tested for stability against attack by moist sulfur oxide-containing gas according to a procedure wherein each is placed in a tube furnace reactor, heated to 300°C., (572°F.), subjected to a constant flow of gas consisting of 20% $SO_2$ and the remainder water vapor-saturated air by volume for an interval of 19 hours, and finally cooled to room temperature and examined.

The extent of attack on the beta-spodumene structure of each sample is directly proportional to the amount of lithium salts formed on the surface of the sample as the result of the spodumene-water-sulfur oxide interaction. These salts are removed by washing and quantitatively analyzed for lithium by flame photometry, with the amount of lithium being reported on the oxide basis as micrograms of $Li_2O$ extracted per gram of sample weight.

Carrying out the testing procedures described above, it is found that the unprotected sample loses about 325 micrograms of $Li_2O$ per gram of sample weight as the result of sulfur oxide-water attack, while the protected sample loses only about 132 micrograms of $Li_2O$ per gram of sample weight under identical test conditions.

EXAMPLE II

The testing procedures of Example I are carried out with an additional pair of beta-spodumene honeycomb samples, except that the samples are positioned in the tube furnace on boats of platinum foil. Corrosion is somewhat more severe than in the foregoing example because some of the $SO_2$ is oxidized to the more corrosive $SO_3$ by the presence of the platinum foil.

Over an exposure interval of 19 hours under the conditions described, an unprotected beta-spodumene sample loses about 6,340 micrograms of Li$_2$O per gram of sample weight as the result of sulfur oxide-water vapor corrosion. A beta-spodumene sample protected by a fluorinated ethylene-propylene film, on the other hand, loses only about 1,172 micrograms of Li$_2$O per gram of sample weight under identical test conditions.

EXAMPLE III

The testing procedure of Example I is repeated with an additional pair of beta-spodumene honeycomb samples, except that the gas stream contains about 1% SO$_3$ in place of the 20% SO$_2$, and the test is continued for an exposure period of 3 hours instead of 19 hours.

After exposure to flowing moist SO$_3$-containing gas at 300°C. (572°F.) for 3 hours, an unprotected beta-spodumene honeycomb loses about 3,105 micrograms of Li$_2$O per gram of sample weight, whereas an FEP-protected sample loses only about 1,891 micrograms per gram of sample weight.

EXAMPLE IV

As previously noted, attack by exhaust gases containing water vapor and sulfur oxides can induce permanent dimensional changes in beta-spodumene materials. The effectiveness of fluorinated ethylene-propylene films in protecting beta-spodumene from permanent dimensional change was tested with a pair of beta-spodumene honeycomb samples ½ inch × ½ inch × 3 inches in size cut from a honeycomb regenerator wheel such as described in Example I. One sample was provided with an FEP film about ½ mil in thickness according to the procedure described in Example I, while the other was left unprotected.

Both samples were carefully measured in the 3 inch dimension and then subjected to sulfur oxide attack in a tube furnace under conditions identical to those described in Example III, except that 4% SO$_3$ rather than 1% SO$_3$ was present in the flowing furnace atmosphere.

After exposure to moist SO$_3$-containing gas at 300°C. (572°F.) for 3 hours, it was found that the unprotected sample exhibited a length change of +347 ppm, while the FEP-protected sample exhibited a length change of only +144 ppm.

EXAMPLE V

A large ceramic honeycomb regenerator wheel is selected for treatment. This wheel is composed of Corning Code 9455 glass ceramic material, a material consisting predominately of beta-spodumene but also containing a minor amount of mullite. This wheel is about 3 inches in thickness and about 28 inches in diameter, having about 900 channels per square inch of frontal surface area traversing the thickness thereof.

A fluorinated ethylene-propylene film about ½ mil in thickness is applied to the face of the wheel which is to be the cold face in operation in the turbine engine. The cold face is first sprayed with 40% dispersion of fluorinated ethylene-propylene in water and the resultant coating forced into the pore structure of the material with compressed air. This process is repeated once and then the entire structure is heated to 625°F. for 1 hour to form the protective film.

The regenerator wheel prepared as described is directly employed in a gas turbine engine in place of a conventional regenerator and tested for 100 hours with a high sulfur fuel to accelerate the effect of sulfur corrosion on the beta-spodumene structure. Lithium extraction from cold face regions is substantially reduced in the case of the protected regenerator, indicating that significant increases in regenerator service life will be realized under normal operating conditions.

From the data presented above in Examples I–V it is apparent that protective films consisting of a fluorinated copolymer of ethylene and propylene provide a useful means for improving the resistance of beta-spodumene ceramic articles to attack by moist sulfur oxide-containing atmospheres even at temperatures in excess of 400°F. Thus our invention may be employed to substantially increase the service life of ceramic regenerators or other beta-spodumene ceramic articles when exposed to sulfur-containing exhaust gases of fossil fuel combustion processes or the like.

We claim:

1. A beta-spodumene gas turbine regenerator demonstrating improved resistance to attack by exhaust gases containing sulfur oxides and water vapor at temperatures in the range of about 400°–650°F. having on at least a portion thereof a protective film consisting essentially of a fluorinated copolymer of ethylene and propylene.

* * * * *